(12) United States Patent  (10) Patent No.: US 7,628,093 B2
Madhani et al.  (45) Date of Patent: Dec. 8, 2009

(54) THREE-AXIS ROBOTIC JOINT WITH HUMAN-BASED FORM FACTORS

(75) Inventors: Akhil J. Madhani, Pasadena, CA (US); Bryan S. Tye, Canyon Country, CA (US)

(73) Assignee: Disney Enterprises, Inc., Burbank, CA (US)

( * ) Notice: Subject to any disclaimer, the term of this patent is extended or adjusted under 35 U.S.C. 154(b) by 308 days.

(21) Appl. No.: 11/682,977

(22) Filed: Mar. 7, 2007

(65) Prior Publication Data

US 2008/0216596 A1    Sep. 11, 2008

(51) Int. Cl.
 *B25J 17/00* (2006.01)
(52) U.S. Cl. ............ 74/490.04; 74/490.05; 74/490.03; 901/15; 901/26; 901/21
(58) Field of Classification Search ................ 74/490.01–490.006; 901/15, 21, 19, 26–29, 901/1; 414/5, 7
See application file for complete search history.

(56) References Cited

U.S. PATENT DOCUMENTS

| | | | | |
|---|---|---|---|---|
| 2,992,746 A | * | 7/1961 | Olson et al. ............... 414/4 |
| 3,212,651 A | * | 10/1965 | Specht et al. .............. 414/7 |
| 4,697,472 A | * | 10/1987 | Hiyane ................. 74/490.02 |
| 4,806,066 A | * | 2/1989 | Rhodes et al. ............ 414/729 |
| 4,903,536 A | * | 2/1990 | Salisbury, Jr. et al. ...... 74/89.22 |
| 4,921,293 A | | 5/1990 | Ruoff et al. |
| 5,697,256 A | * | 12/1997 | Matteo .................. 74/490.04 |
| 5,792,135 A | * | 8/1998 | Madhani et al. ............ 606/1 |
| 6,786,896 B1 | | 9/2004 | Madhani et al. |
| 7,398,707 B2 | * | 7/2008 | Morley et al. ............ 74/490.06 |
| 2003/0223844 A1 | * | 12/2003 | Schiele et al. ............ 414/5 |
| 2006/0030841 A1 | * | 2/2006 | Madhani et al. ............ 606/1 |

OTHER PUBLICATIONS

Khamis, ALAA, "Morphology, Lecture 3 Introduction to Robotics" Master course 06-07; http://cs.guc.edu.eg/courses/robotics/slides/L3-Morphology.pdf, pp. 1-55, obtained Jun. 2007.

(Continued)

*Primary Examiner*—Richard W L Ridley
*Assistant Examiner*—Terence Boes
(74) *Attorney, Agent, or Firm*—Marsh Fischmann & Breyfogle LLP; Kent A. Lembke

(57) ABSTRACT

A robotic joint configured as a 3-axis joint configured with a shoulder or other human joint form factor. The joint includes a first link made up of a block attaching to a torso and a stationary electric actuator assembly mounted to the block. A second link is connected to the first link to rotate about a first axis and be driven by the actuator assembly. A third link is attached to the second link to rotate about a second axis orthogonal to the first axis when the third link is driven by the actuator assembly. A fourth link is connected to the third link to rotate about a third axis orthogonal to the second axis when the fourth link is driven by the actuator assembly. The actuator assembly includes three electric motors with threaded drive capstans driving pulleys in the links while being spaced apart from the rotating links.

17 Claims, 14 Drawing Sheets

OTHER PUBLICATIONS

Eberman, Brian Scott, "Whole-Arm Manipulation: Kinematics and Control" Jan. 1989; Submitted in Partial Fulfillment of the Requirements of the Degree of Master of Science in Mechanical Engineering at the Massachusetts Institute of Technology, http://citeseer.ist.psu.edu/eberman89.wholearm.html, obtained Jun. 2007.

Black, Derek, and Grupinski, Stephen, Evaluation of State-of-the-Art Manipulators and Requirements for DOE Robotics Applications Topical Report, 1st and 2nd Drafts Compiled Jun. 1, 1998-Jul. 16, 1998, Final Revision Issued: Oct. 8, 1998; http://www.osti.gov/bridge/purl.cover.jsp?purl=/7106-VrqBvx/native/; obtained Jun. 2007.

* cited by examiner

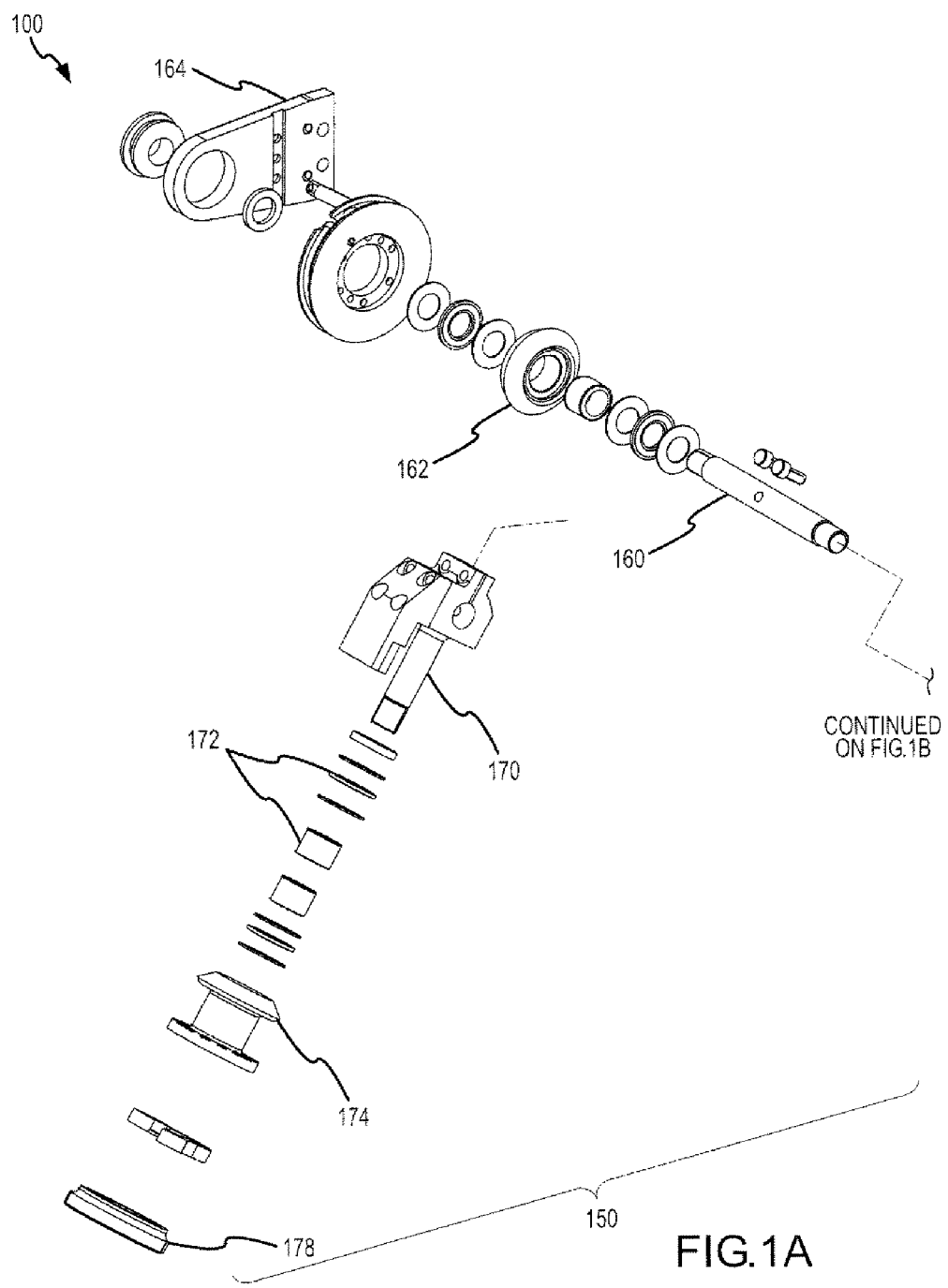

THREE-AXIS ROBOTIC JOINT WITH HUMAN-BASED FORM FACTORS

BACKGROUND OF THE INVENTION

1. Field of the Invention

The present invention relates, in general, to robotic joints, and, more particularly, to a robotic joint using electrical actuators such as motors in combination with cable transmission to provide a 3-axis joint that replicates movements of a human or human-like shoulder joint with a similar form factor, e.g., the robotic joint and actuators can be mounted within a structure or shell having human or similar dimensions and/or form.

2. Relevant Background

There are many applications for robotic joints. Many characters or figures including those found in theme parks are animated with limbs that move using robotic joints. Effective animated figures, e.g., animatronic figures that are human or human-like such as characters given human qualities and movements, have been created using robotics. However, it has proven difficult to design a robotic joint that can effectively simulate human joints and, particularly, human shoulder, hip, and similar joints. For example, difficulties with designing robotic should joints include the relatively tight or small form factor provided by the figure's structure at or near the shoulder. For example, a character with human or similar proportions would need to contain all the components of the shoulder joint and internal machinery within the skin or covering over the shoulder or nearby such as in the body cavity (e.g., within the form of the human body or the character body). Another shoulder design challenge involves providing the range of motion provided by human and other similar shoulder joints at the same speed and providing arms or limbs with desired strength, e.g., similar or greater than a human.

Traditionally, animatronic figures or figures using robotic joints were designed to use hydraulic actuators including cylinders and servo valves. More recently, robotic joints have been designed using electric actuators such as direct current (DC) motors to provide the motive force for the joint. Each of these types of robotic joints has its own advantages for use in creating a human or human-like shoulder joint, but associated disadvantages and design issues continue to exist. Hence, there remains a need for an improved robotic shoulder joint.

Early industrial robotics used hydraulic actuators. While appearing in general shape and function to be "arms" that rotate about a shoulder joint, most designs had no form factor constraints similar to a human body's external envelope constraint. As a result, hydraulic actuator-based robotics designed for industrial use generally do not lend themselves to use with joints simulating human joints or representing a human shape or its shoulder function. Hydraulic actuators include a hydraulic power supply made up of an electric pump, an oil tank, filters, accumulators, and associated components. The power supply is used to create a high pressure source of hydraulic fluid that is piped to a manifold that houses a series of hydraulic servo valves, which meter oil to hydraulic cylinders placed local to each joint or axis of motion of a robot or animated figure. A control computer may be used to provide commands or control signals to the various servo valves to achieve a desired movement of the hydraulically actuated joint.

Hydraulically actuated robotic joints have a number of advantages including the high power density (e.g. high force for a given speed) of hydraulic cylinders. Also, these joints are relatively easy to design and use in part because they may be attached simply by using spherical rod ends that make it easy to create pivoting joints. These robotic joints also have long lives since the contacting elements include sliding seals that are intrinsically oil lubricated. Hydraulically actuated robotic joints have many offsetting disadvantages including the fact that hydraulic systems are typically messy and dirty as they leak oil that attracts dirt and stains the animatronic figure including the joints, skins, clothing, and/or other figure finishing. These joints may be dangerous to operate due to the high pressure oil used for power that potentially can spray out of holes in joints and hoses injuring passersby (e.g., guests of a theme park, maintenance personnel, and others nearby to the animatronic figures). Use of hydraulic actuators requires the use of a hydraulic power unit that may be noisy and require pumps, tanks, filters, piping, and cooling mechanisms. It is often hard to run the needed and numerous hydraulic lines through and around the joints due to limited flexibility and size of tubing that can handle the high operating pressures. Also, the achievable servo bandwidth is limited by the distance of the hydraulic lines between the servo valves and the hydraulic cylinder, and further, the servo valves are too large to fit within the external envelope or to conform to a desired form factor of a human or other animatronic figure. Additionally, it is difficult to make such figures mobile or portable due to the size and noise associated with the hydraulic infrastructure.

Due to these limitations, electric motors have been used for at least the past twenty years in place of hydraulic actuators in commercial robotics. However, a number of problems have made it difficult to design a proper form factor robotic shoulder joint. In electric actuators, electronic amplifiers are commanded to supply specified currents to electric motors. The motor is typically placed local or in the joint of the robot or animated figure. As with hydraulic actuators, the commands or control signals provided to the amplifiers are generally provided by one or more controllers or control computers. Electric actuators have the advantage over hydraulic actuators of being clean and easy to maintain. Also, the behavior of electric motors is well understood and is useful for creating repeatable and controllable motions. With electric actuators, it is relatively easy to monitor force output using motor currents, which is helpful in certain control tasks and allows use of simple methods to limit output force to ensure safety.

Unfortunately, electric actuators typically have lower power density when compared with hydraulic actuators making it difficult to achieve desired accelerations. Electric actuators may require complicated mechanical designs or configurations because of the speed reduction required between the motor and the joint and due to the form factor of the electric motor. Other joint designs have driven the differential with cables or gears but have placed the drive motors or actuators in or near the joint, which makes compliance with the form factor difficult and also undesirably increases moving inertia as the motor mass moves along with the joint components. This, in turn, reduces achievable accelerations or motion performance and can also reduce load carrying capacities. Hence, electric actuators have not proven widely useful for creating shoulder and other "human" joints due to difficulty in complying with the associated form factors and due to power and speed constraints.

There remains a need for an improved mechanism for use as a shoulder joint in robots or animatronic figures or characters. Preferably, the mechanism would simulate the movement and functionality of a human shoulder joint and would be configured to comply with the form factor of a human shoulder or human-like proportions for a shoulder (e.g., within the robotic figure's shoulder and body cavity or structure). Additionally, it is preferable that the shoulder mechanism be safe and clean to operate.

SUMMARY OF THE INVENTION

The present invention addresses the above problems by providing a 3-axis robotic joint particularly suited for simulating movement of a human shoulder and similar joints. The 3-axis robotic joint uses a combined cable transmission and differential mechanism. The joints of embodiments of the invention are designed to provide a shoulder range of motion to be substantially similar to that provided by a human shoulder, which represents a significant increase over many existing animatronic shoulder joints (e.g., up to a 100 percent increase in range of motion). The 3-axis robotic joints of the present invention also comply with form factor constraints associated with replicating human or similar shoulder, hip, and other joints. For example, a robotic shoulder joint of the present invention is effectively achieved in part by driving the joint with three electric motors that are placed (e.g., mounted rigidly) at the base of the "shoulder" within the chest or body cavity of a robotic or animatronic figure or character, which addresses size and packing problems associated with many prior shoulder joint designs.

More particularly, a robotic joint is provided that is configured as a 3-axis joint or a roll-pitch-roll joint. The joint includes a first link made up of a block or housing for attaching to a torso or robot body structural member, e.g., a "scapula" used for shoulder shrugs or the like, and an electric actuator is mounted to the block so as to be stationary relative to other joint components. A second link is connected to the first link to rotate about a first axis and to be driven by the electric actuator. A third link is attached to the second link to rotate about a second axis that is orthogonal to the first axis when the third link is driven by the electric actuator. Additionally, a fourth link is included in the joint and is connected to the third link so as to rotate about a third axis that is orthogonal to the second axis when the fourth link is driven by the electric actuator (e.g., indirectly via shoulder drive pulleys). In the joint the first axis may be considered an input roll axis, the second axis may be considered a pitch axis, and the third axis may be considered an output roll axis (e.g., shoulder output).

In some embodiments, the electric actuator includes three electric motors that are independently operated to drive the second, third, and fourth links. Significantly, the electric motors are spaced apart from the links they are driving such that the links rotate apart from or separately from the motors to better control inertia and acceleration. To allow proximate but spaced apart driving, the joint includes a set of cables and three pulleys or capstans connected to the output of the electric motors and to the cables to drive the second, third, and fourth links. In other words, embodiments of the robotic joint use a combination of an electric actuator and a cable transmission to provide a 3-axis joint. More specifically, a roll drum or pulley may be mounted to or be provided as part of the second link and attached to the cables (e.g., a cable loop or two or more cable segments) to be driven by one of the electric motors to rotate about the first or input roll axis. A pair of shoulder drive pulleys are mounted in the shoulder joint for rotation about the second or pitch axis and are attached to cables (or each to a cable loop or two or more segments) that are attached to the other two electric motors such that the roll drum and each of the shoulder drive pulleys are independently driven by one of the motors. Cables that drive the shoulder drive pulleys extend from the electric motor pulleys or capstans through the roll drum (e.g., a hole or opening in the drum) parallel or substantially parallel to the first or input roll axis (or at least transverse to the second or pitch axis). Each of the shoulder drive pulleys is rigidly attached to a gear (e.g., a bevel gear with differing numbers or equal numbers of teeth) and these two gears are meshed with a gear driven member to provide a rotation output for the shoulder joint about the third or output roll axis. The gear driven member may be, for example, attached to a threaded stub or the like to receive a limb or arm and may be considered part of the fourth link and to pivot about the second or pitch axis with the third link.

According to another aspect, a robotic figure is provided that uses a 3-axis joint of the present invention to provide human or human-like joint functions within an acceptable form factor (e.g., shoulder, hip, or other joint functions within a space and shape proportional to a human or human-like shoulder including a portion of the adjacent body cavity). The robotic figure includes a torso with a body cavity. An actuator is mounted within the body cavity and includes three electric motors with pulleys (e.g., threaded drive capstans or the like) attached to the outputs of the electric motors. A differential is spaced apart from the actuator and is configured to generate an output rotation. A set of cable segments is used to connect the actuator pulleys of two of the electric motors to the differential such that the differential is cable driven by operation of the two motors, which can be operated independently or concurrently at the same or differing speeds. The robotic figure may further include a roll drum that is positioned between the actuator pulleys and the differential and mounted for rotation about an input roll axis. The roll drum is connected by one or more cable segments to the remaining actuator pulley to be driven by the third electric motor, and in some embodiments, the cable segments connecting the first two actuator pulleys to the differential extend through the roll drum (e.g., along or substantially parallel to the input roll axis through a passageway or opening extending through the drum's body). The differential in one embodiment is made up of three contacting and/or meshing gears (e.g., bevel gears or the like), and a pair of the gears is facing each other (e.g., bevel side gears) and rotates about a pitch axis that is orthogonal to the input roll axis. A third gear is positioned between the other two gears and rotates at the output rotation about an output roll axis, which is also orthogonal to the pitch axis. The third gear may be provided as a portion of a cylindrical member and/or a stub may be attached to the third gear. During operations, the third gear and stub are driven by the actuator to rotate about the pitch axis while also being driven by the actuator to rotate about the pitch axis while also being driven by the first and second gears to rotate about the output roll axis. To this end, the first and second gears are typically each affixed to pulleys that are connected via cable segments to the output pulleys of the first two electric motors. The differential may also be linked to the roll drum so as to rotate about the input roll axis when the roll drum is driven by the third electric motor. For example, a T-shaped link or element may be provided upon which the three gears may rotate with the paired sided gears being placed on the cross member or top of the "T" that extends along the pitch axis.

DETAILED DESCRIPTION OF THE PREFERRED EMBODIMENTS

Briefly, the present invention is directed to a robotic joint assembly with three axes of motion that uses three electric actuators. The robotic joint assembly is useful in human or human-type robots or animated/animatronic figures as a shoulder joint. The described joint assemblies may also be used for other joints such as for a hip joint, an ankle joint, and the like, and, therefore, while use as a shoulder joint is emphasized in the following description this is not intended as a limitation. The robotic joint assembly overcomes the transmission and packaging (or form factor) problems associated with prior shoulder and other joint designs by utilizing cables as a transmission medium in a unique manner. Embodiments of the robotic joint assembly use three electric motors that drive capstans as the actuators for the cable transmission system, and all three of the electric motors are mounted within the body cavity to be stationary relative to shoulder linkages (e.g., the actuator is not provided within or as part of the joint portion of the assembly) while being positioned apart but proximate to the linkages. This arrangement reduces the moving inertia and increases achievable accelerations, and hence, motion performance and load carrying capacity is enhanced for the shoulder joint assembly. Furthermore, since no motors or actuators are placed outside the body cavity (or at relatively distant or distal positions relative to the joint axes), additional room is reserved or available for distal axes such as other joints including those associated with an elbow, a wrist, a hand, and fingers or other body appendages.

As will become clear from the following description, the 3-axis robotic joint assembly in accordance with the invention addresses some of the issues previously associated with using electric motors to drive a robotic shoulder or other joint for human or human-like figures. In particular, embodiments of the inventive assembly describe a method of packaging electric motors within the form factor of the human or human-like body (e.g., within the arm, shoulder, and/or body cavity portions of such figure). At the same time, the assemblies place electric motors proximate to the joint (but not part of the joint) such that they do not move with the joint or linkage components. In other words, the weight and corresponding inertia of the electric motors, which is a significant portion of the joint assembly's weight, does not move as the joint or its components move. As a result the overall inertia of the joint is significantly reduced.

Figure 1B:
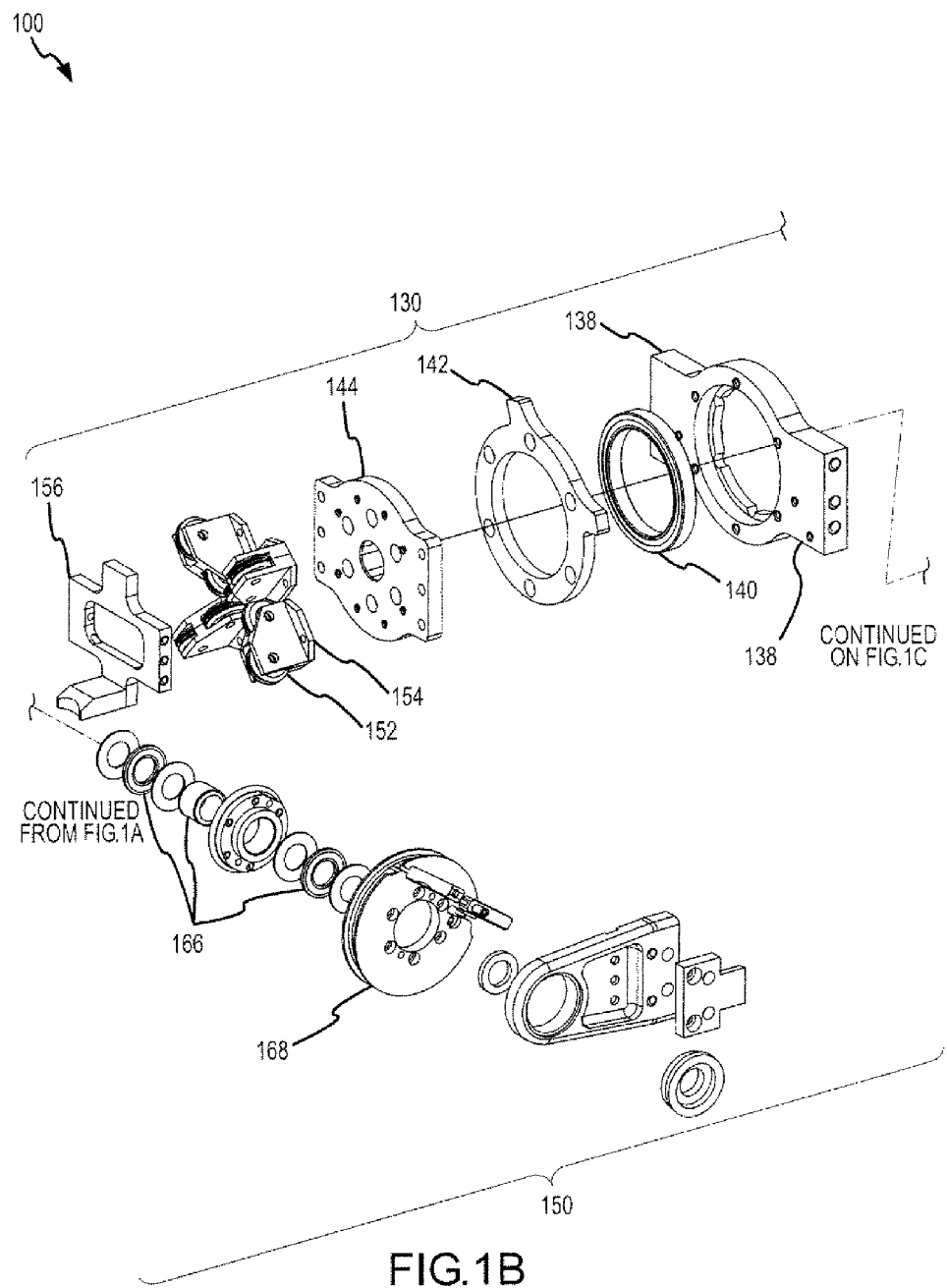
FIG. 1 is an exploded perspective view of a 3-axis robotic joint according to one embodiment of the invention showing the electric actuator assembly and components of the roll and pitch assemblies (with the cables of the transmission excluded for ease of illustration and shown in detail in other figures)
Figure 1C:
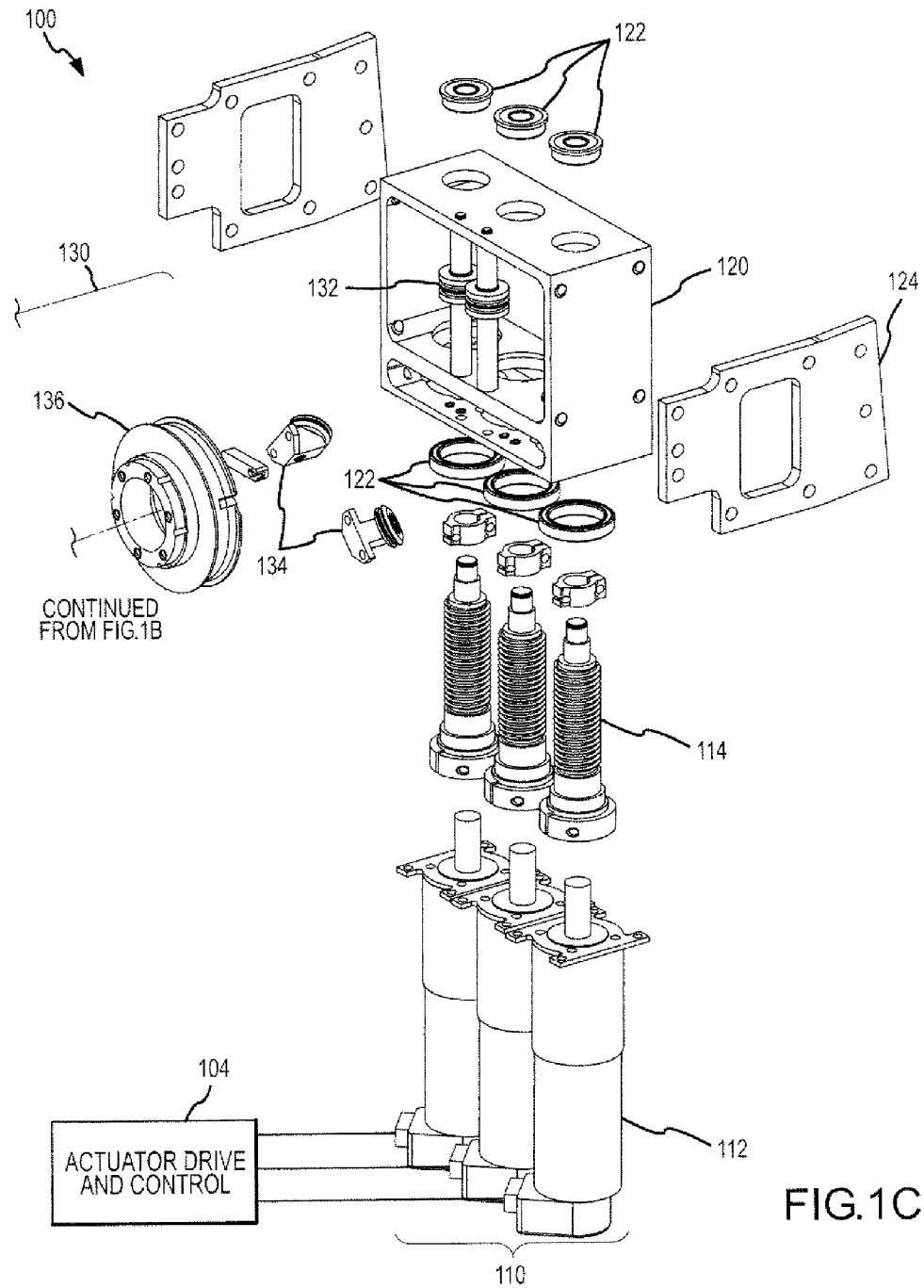

The 3-axis robotic joint may be generally thought of as a roll-pitch-roll joint. FIG. 1 illustrates an exploded view of one configuration of components useful for implementing such a roll-pitch-roll joint using a combination of an electric actuator(s) and a cable/pulley transmission system. A 3-axis robotic joint 100 of one embodiment of the invention includes an actuator drive and control 104 for providing control signals to an actuator assembly 110. The actuator drive and control 104 may include one or more computers, software, electronic components, and the like that are well-known for selectively operating electric actuators 112. Actuator assembly 110 includes three electric motors (e.g., motor and gear head assemblies such as planetary gear head, brushed DC servomotors and other DC servomotors such as those distributed by Maxon or other distributors) 112 with their output shafts (which often are arranged parallel) affixed to three driving capstans or threaded drive capstans 114. When the joint 100 is assembled for operation, the capstans 114 would be wound with the end of cable loops or cable segments used to drive the cable transmission of the joint 100 (with the cables not being shown in FIG. 1).

Figure 2:
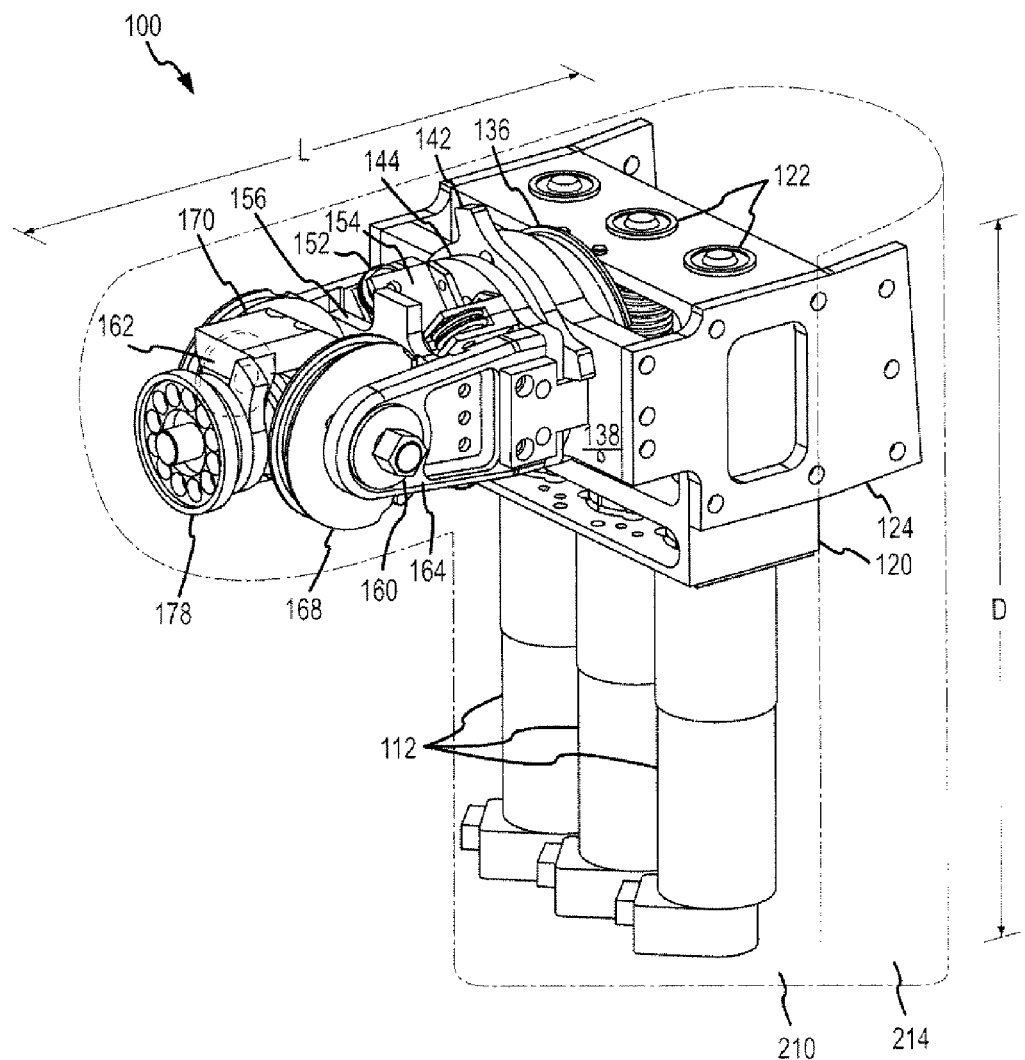
FIG. 2 illustrates a perspective view of the 3-axis robotic joint of FIG. 1 as it appears when assembled for use as a shoulder joint (but without cabling installed) and showing a body mounting structure that supports the drive actuators apart from the joint components and also showing a shoulder form factor in which the robotic shoulder joint in accordance with the invention is placed or constrained.

The capstans 114 extend into the interior of a housing or block 120 (e.g., an aluminum or other metal, plastic, or other useful structural material) with the motors 112 being mounted to the exterior or bottom of the block 120. To facilitate mounting and later operation/rotation of the driving capstans 114, bearings 122 are included to mate with block 120 surfaces. A pair of side plates 124 are attached to exterior of the block 120, and the side plates 124 are in turn rigidly attached to mounting structure of a robotic character or animatronic figure. For example, the plates 124 may be mounted to a "scapula" or other mounting elements within or part of a body cavity (as shown in FIG. 2) such that the actuator assembly 110 is held substantially rigid or stationary relative to the driven components of the joint 100 such as the transmission cables (not shown in FIG. 1), pulleys, and gears of the differential and/or joint. In some cases, the side plates 124 are attached to a "shrug" axis to be moved in a shrug or other shoulder movement while not moving with or as part of the shoulder joint or other joint movements so as to not negatively affect inertia and acceleration characteristics of the joint 100.

The cable transmission of the joint 100 is driven by cable attached to the capstans 114 or is driven by the electric actuator assembly 110 and comprises an input roll assembly 130 and a pitch and output roll assembly 150. The input roll assembly 130 includes four idler pulleys 132 mounted with shafts within the block 120 (e.g., a pair of pulleys 132 on each shaft), and the idler pulleys 132 are used for directing the pitch and output roll cables linked to the pitch and output roll assembly 150 as explained in more detail beginning with FIG. 3. The assembly 130 also includes a pair of idler pulleys 134 exterior to the block 120 and mounted to plate 138 that are used to direct and support the first or input roll assembly 130 (e.g., cables used to provide movement or rotation on the input or first roll axis of the joint 100). The idler pulleys 134 direct cable or cable segments to a roll drum 136 to which the cable is affixed so as to drive the drum to rotate about the first or input roll axis. The roll drum 136 is a cable driven drum that is used to create the first or input roll axis and is hollow to provide a passageway for cables passing from idler pulleys 132 to the pitch and output roll (or second roll axis) assembly 150, with the cables generally extending parallel to the first or input roll axis.

The input roll assembly 130 further includes a plate 138 that is rigidly mounted onto the side plates 124 and is adapted to support the roll drum 136 on a bearing 140 (e.g., a 4-point contact bearing or the like about which the first roll axis operates) to allow the drum 136 to rotate when driven by cables attached to a driving capstan 114 (e.g., the drum 136 is rotatably mounted within the assembly 130 and joint 100). A bearing retainer and stop ring 142 is attached to the plate 138 to maintain the position of the bearing 140 and provide an additional contact surface. Further, the stop ring 142 acts to define the range of motion for the roll drum 136 about the first or input roll axis as can be seen in FIG. 2. In FIG. 2, one or two extensions or "stops" of the stop ring 142 has come in contact with a stop plate or portion of the pitch and output roll assembly 150 (although such a stop plate or portion may be provided in another manner). In this manner, the shoulder input roll is limited to less than about 225 degrees as would be the case with a human or human-like shoulder joint or other joint. A base plate 144 is attached to the drum 136 rotating with bearing 140 and providing mounting points and support for the pitch and output roll assembly 150.

Figure 3:
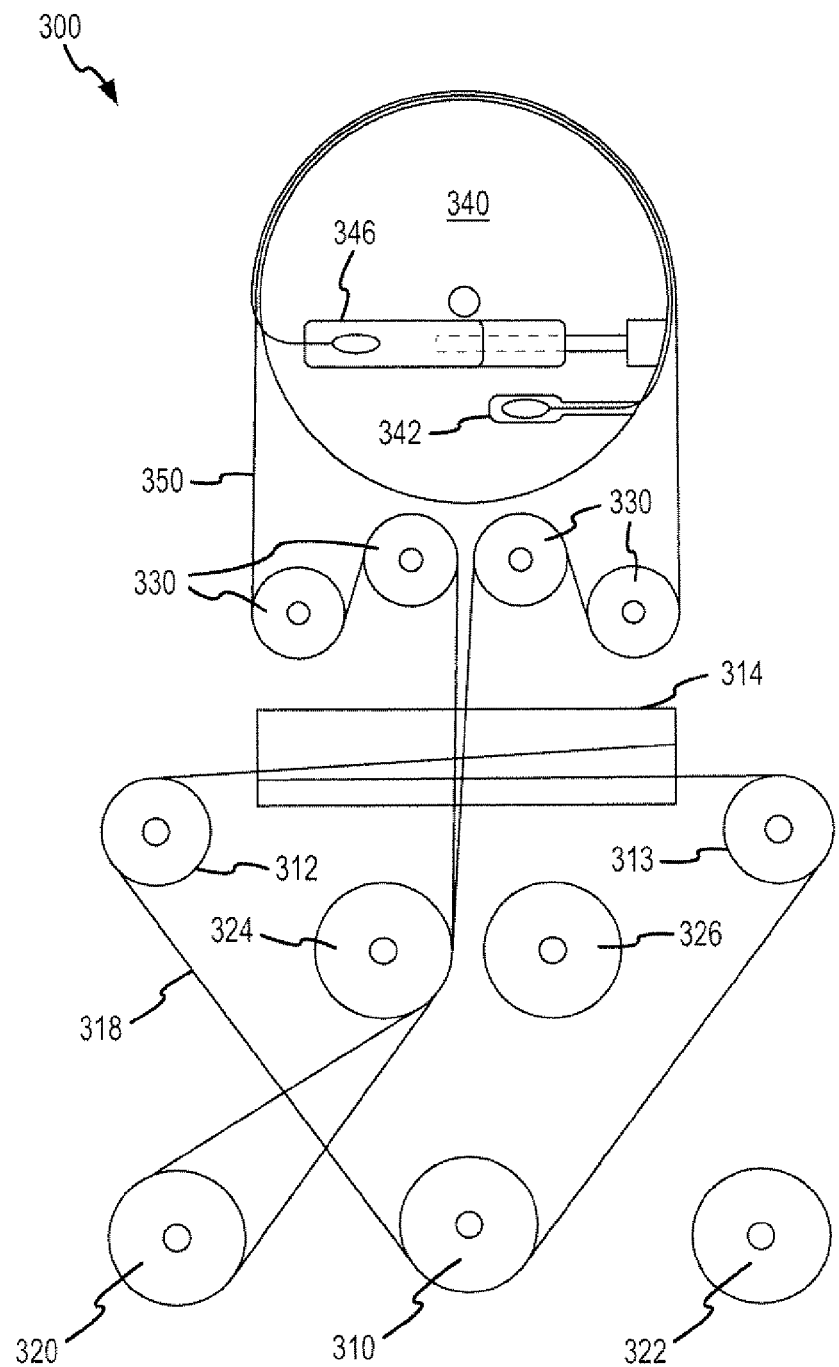
FIG. 3 is a schematic of an exemplary cable transmission assembly in accordance with the invention such as may be implemented within the 3-axis robotic joint shown in FIGS. 1 and 2.

Specifically, a pulley sheath bracket or pulley mounting assembly 154 is attached to the base plate 144, and the pulley sheath bracket 154 supports or enables rotatable mounting of idler pulleys 152 that are used to guide cables passing through the drum 136 from actuator assembly 110 to shoulder drive or driven pulleys 168. In some embodiments, eight idler pulleys 152 are provided to achieve this function as shown in FIG. 3 (with 4 being hidden in this view) and FIGS. 9-12 but differing numbers may be used to practice the invention. A motion limiting plate 156 is attached to side plates 164 and acts to limit movement of the output of the shoulder joint 100 by contacting the main block 170 (e.g., to limit pitch motion to less that 180 degrees for the output to simulate a human or human-like shoulder output range of motion for moving a limb such as an arm).

A main shaft 160 is provided that extends or defines the second output axis of the joint 100. A cable driven differential is created in the pitch and output roll assembly 150 by the inclusion of two bevel side gears 162, which ride on or are supported for rotation on shaft 160 by needle bearings 166, in combination with a top bevel gear 174 provided along the third or output axis of the joint 100. The gear 174 is attached to a threaded stub 178 that provides the output of the shoulder joint 100 (e.g., an attachment for a limb or arm), and the gear 174 is rotatably mounted via needle bearings 172 to a shaft on the main block 170, which in turn is clamped to the main shaft 160 to rotate about the second axis with the main shaft 160. The side bevel gears 162 are attached to and driven by shoulder drive pulleys 168 which are supported for rotating through bearings 166 on shaft 160. Shoulder drive pulleys 168 comprise cable driven pulleys that are driven by the driving pulleys provided by the capstans 114 of the actuator assembly 110 (as is the roll drum 136 of the input roll assembly 130).

FIG. 2 illustrates the 3-axis robotic joint 100 of FIG. 1 after assembly (but without cables). Further, the joint 100 is shown as it would appear when mounted to a mounting structure 214 within a robot or animatronic figure or the like for use, in this exemplary case, as a shoulder joint. The side plates 124 are attached to the block or housing 120 and to the structure or frame 214 so that the block 120 is stationary relative to the components of the roll assembly 130 and pitch and output roll assembly 150. The frame or structure 214 may be a "scapula" that can be moved to shrug a shoulder including the block 120, and typically, the structure 214 is provided within a body cavity of the robot or animatronic figure such that the joint 100 provides mounting of the actuators 112 within the body cavity and also proximate to the driven components without requiring mounting on these components or as part of the moving portions of the joint 100.

Significantly, the joint 100 is configured or designed to fit within a form factor shown by the dashed line 210 that represents dimensions and proportions of a human or human-like figure (e.g., a robot simulating a human or a character with human-like features as is often the case with animated figures in theme parks and other applications using animatronic figures). For example, the form factor 210 may define a diameter within which the components of the roll assembly 130 and the pitch and output roll assembly 150 must fit. Further, the form factor 210 may define a length, L, in which these components and the block or housing 120 (and other components of the actuator assembly 110) should fit. Yet further, in some cases, the form factor 210 may define a depth, D, in which the housing or block 120 and electric motors 112 need to be positioned so as to fit within a particular portion of a body cavity of an animatronic figure or robot. Specific dimensions are not limiting to the invention as the form factor 210 may have dimensions that are proportionate to the overall size of the particular animatronic figure or robot. However, for a figure that is simulating an average-sized human, the form factor 210 may have a diameter (e.g., a diameter of an arm or other appendage) less than about 5 inches, a length, L, of less than about 10 inches, and a depth, D, of less than about 11 inches. Again, these dimensions are not limitations of the present invention but are useful for showing how the joint 100 is adapted for complying with typical design limitations placed on designers of animatronic figures and robots that are used to simulate a human or human-like shoulder using electric actuators that are mounted near cable driven components such as a differential and by providing a unique cable, pulley, and gear arrangement in the transmission of the joint 100.

FIG. 3 illustrates schematically a cable layout or transmission 300 for use in 3-axis robotic joints of the present invention such as in the embodiments shown in FIGS. 1 and 2. As shown, the transmission 300 includes three driving capstans 310, 320, and 322 such as may be attached to the output of electric motors. A driving capstan 310 is attached to a cable loop 318 that is passed over idler pulleys 312, 313 and attached to roll drum 314 which creates a first or input roll axis. In other words, the driving capstan 310 rotates in response to an electric actuator or motor and as the cable loop 318 is moved by the capstan 310 the drum 314 is rotated about its axis. With reference to FIG. 1, these components would be thought of as part of the input roll assembly 130 and actuator assembly 110. The cable loops and/or cable segments may take a number of forms to practice the invention and may, for example, be stainless-steel cable such as 0.05 to 0.1 cm or other diameter steel cable, wire, wire rope, or the like.

The driving capstan 320 is attached to a cable loop 350 that contacts two idler pulleys 324 (only one is shown) to be guided through the center of roll drums 314 (e.g. extends parallel to input roll axis or first roll axis of transmission 300). Four idler pulleys 330 are provided to redirect the cable loop 350 (as the "loop" 350 may be formed from two cable segments with the other ends attached to the capstan 320). Additionally, a cable termination with a tensioner 346 may be provided in the pulley 340. With reference to FIG. 1, these components form part of the pitch and output roll assembly 150 as well as part of the actuator assembly 110. Further explanation of cable transmission, such as transmission 300, of the present invention is provided below with reference to FIGS. 4-12, and this discussion more fully describes how the transmission 300 provides a desired 3-axis output in a cable driven shoulder joint such as joint 100. The driving capstan 322 drives a second shoulder drive pulley in a similar manner. By aligning cables close together, nearly parallel, and along axis of cable drum 314, the rotation of the input roll axis does not cause significant length change in the cable loop 350. Also, the relative diameters of input capstans 310, 320 and 322 and input roll drum 314 and shoulder drive pulley 340 provide a useful speed reduction. This lessens the speed reduction requirement of the actuators in the assembly 110.

Figure 4:
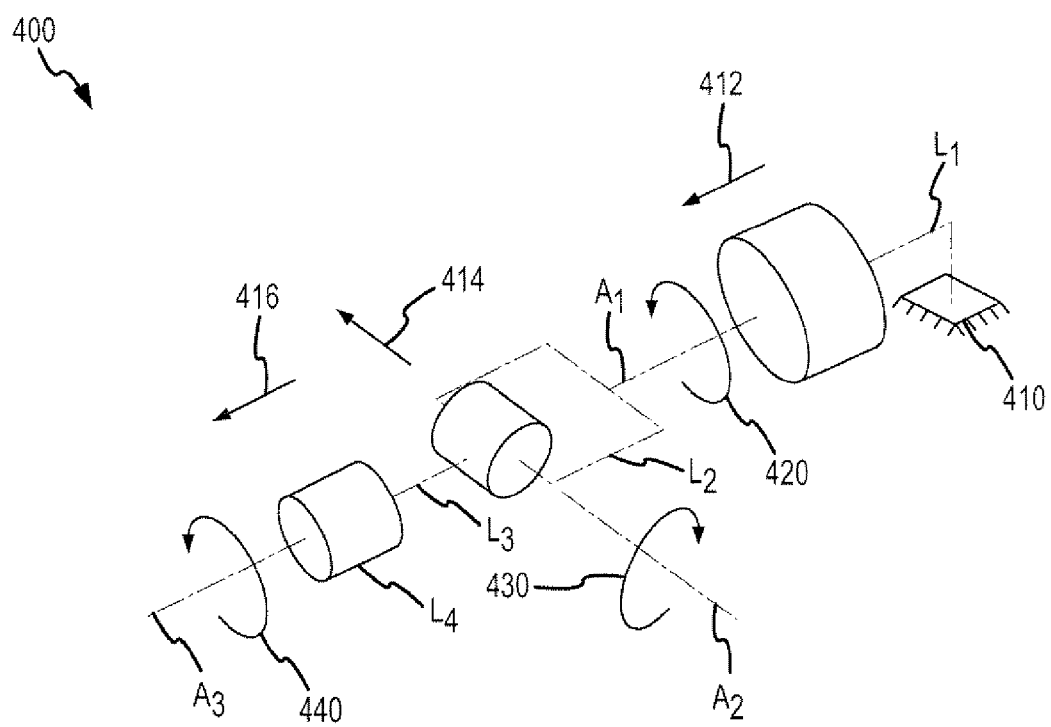
FIG. 4 is a linkage schematic for the 3-axis robotic joints in accordance with the invention such as the joint shown in FIGS. 1 and 2.

As discussed, the robotic joints of the present invention are designed to provide three axes of rotation similar to a human shoulder joint and the like or to be roll-pitch-roll joints. FIG. 4 shows a schematic of a basic joint 400 providing this functionality. Link L1 is the first link and is fixed to a stationary base 410 such as the mounting structure 214 shown in FIG. 2 that may be a "scapula" link or other portion of the torso or body cavity of an animatronic figure including the joint 400. The second link L2 rotates 420 with respect to the first link L1 about a first axis A1. Directions of positive rotation in joint 400 are shown by arrows 412, 414, 416 (following the right hand rule) with rotations shown by arrows 420, 430, 440. Axis A1 is referred to as the input roll axis and is created in the joint 100 of FIG. 1 with the roll drum 136 and link L2 is formed by connection of base plate 144 to roll drum 136 such that the base plate 144 rotates 420 with the drum 136 about axis A1.

The third link L3 rotates 430 with respect to the second link L2 about the second axis A2. This axis A2 is referred to as the pitch axis. With reference to the joint 100 of FIG. 1, the pitch axis is defined by the main shaft 160 and associated components, and the third link L3 includes the main block 170 which is rotated about the pitch axis A2. Finally, the fourth link L4 is adapted to rotate 440 with respect to the third link L3 about the third axis A3, which is referred to as the output roll or output roll axis. The fourth link L4 includes the top bevel gear 174 and attached threaded stub 178 which rotate about the shaft of the main block 170 (or link L3).

In the design of joint 400 (and robotic joint 100), all three actuators (not shown in FIG. 4 but shown as elements 112 in FIG. 1) are attached to the first link L1 (e.g., block 120 and side plates 124 are attached to the structure of the body cavity or torso of the animatronic figure). Therefore, during operation, the actuators are not carried by the joint, and hence, they do not contribute to the overall inertia of the joint beyond the contribution of their rotor inertia and rotating gearbox components. As described in FIG. 3, in order to drive all three axes A1, A2, and A3 with stationary motors (see motors 112 in FIG. 1) affixed to the first link L1, a cable transmission is used in embodiments of the invention. In other words, each joint in the joint assembly 100, 400 is driven through a loop of cable which terminates on both a driving pulley and on a driven pulley with various idler pulleys being provided in between.

Figure 5A:
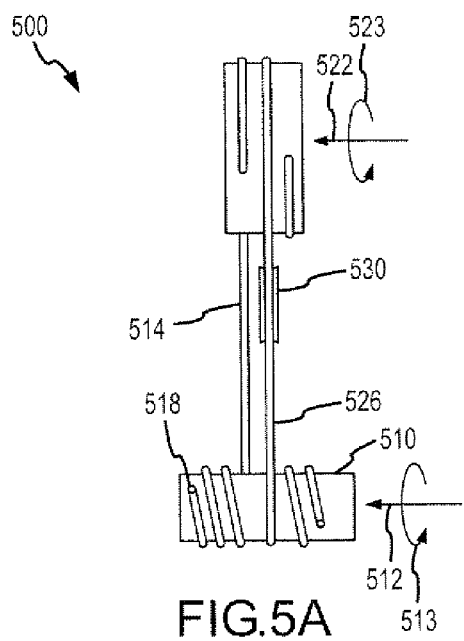
FIGS. 5A-5B illustrate driving and driven pulley arrangements useful in embodiments of the invention.
Figure 5B:
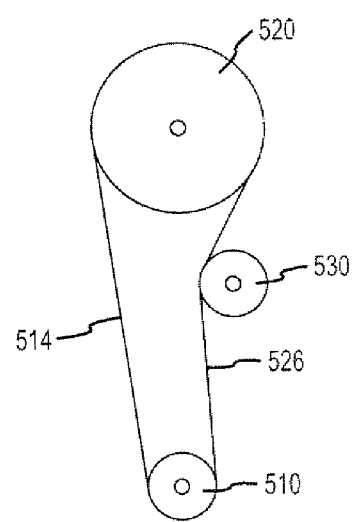

A simplified version of such a transmission or transmission connection 500 is shown in FIGS. 5A and 5B. As shown, driving pulley 510 (e.g., a threaded driving capstan) is rotated 513 about axis 512, such as by an electric motor output. A cable segment 514 is wrapped around the driving pulley 510 and terminates on this pulley at point 518. Cable segment 514 is also wrapped around driven pulley 520 and terminates similarly on this pulley. For example, the driven pulley 520 may be the roll drum 136 or the shoulder drive pulleys 168 shown in FIG. 1, and the driven pulley rotates 523 about its axis 522 in response to movement of the cable segment 514 by pulley 510. In a similar fashion, cable segment 526 is attached to driving pulley 510 and driven pulley 520 but also runs over idler pulley 530 positioned between the driving and driven pulleys 510, 520. Generally, the idler pulley 530 is fixed and simply serves to redirect the path of cable segment 526 without otherwise altering the connection created between the pulleys 510 and 520 by the cable segment 526.

Figure 6A:
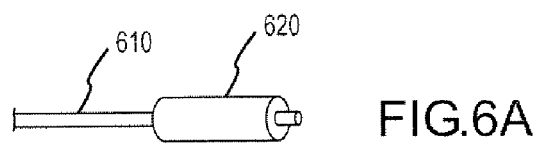
FIGS. 6A-6B illustrate exemplary cable connections for the driving and driven pulleys of the cable transmission in accordance with the invention.
Figure 6B:
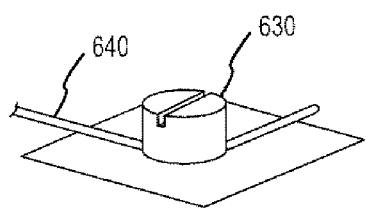
Figure 7A:
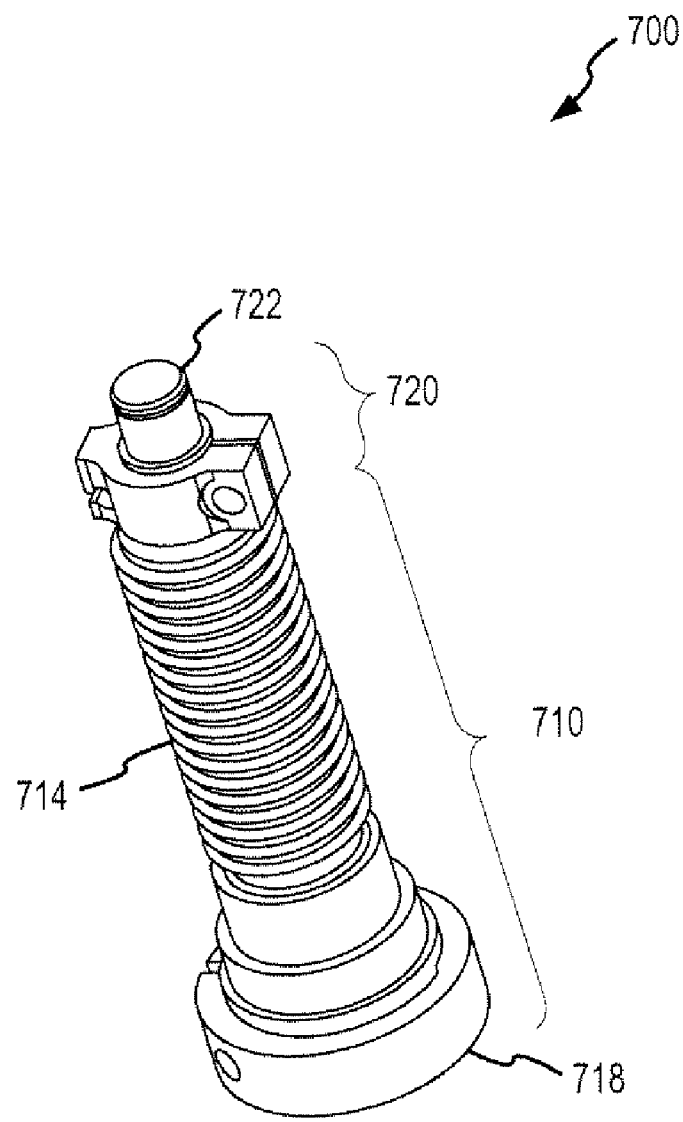
FIGS. 7A-7D illustrate an exemplary driving pulley (e.g., a threaded drive capstan) useful in robotic joints in accordance with the invention showing cable attachments and terminations.
Figure 7B:
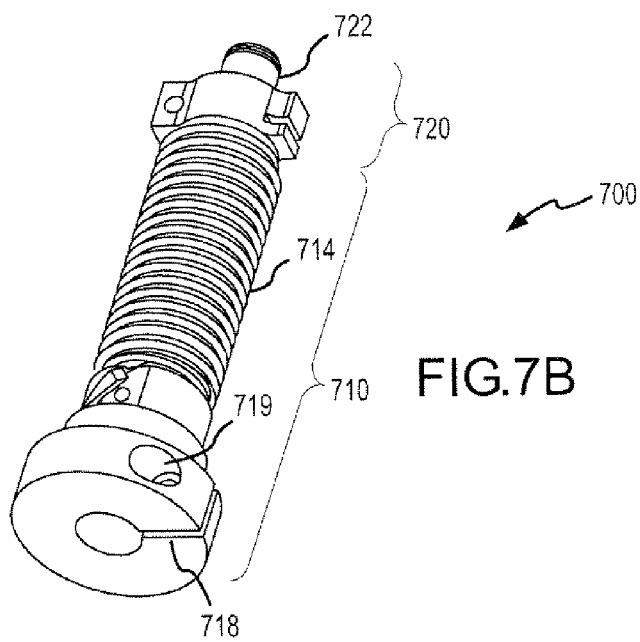
Figure 7C:
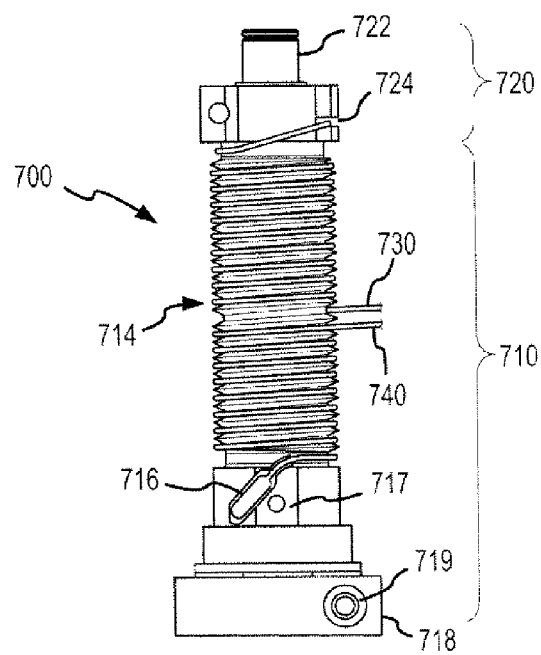
Figure 7D:
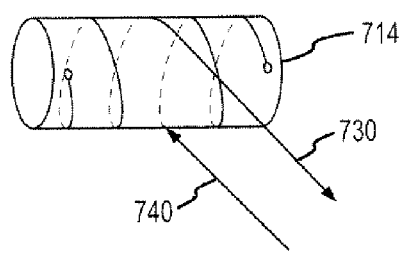

There are, of course, many methods of terminating cables, i.e., affixing the cables to the driving and driven pulleys. FIGS. 6A and 6B illustrate a common crimped stop sleeve 620 attached to the end of a cable segment 610. This may be fit into a recess or pocket in a pulley in order to terminate the cable 610. Alternatively, a cable segment 640 may be held under the head of a fastener (such as a screw or other fastener) 630.

In some embodiments of the invention, the driving pulley is provided as a threaded capstan 700 as shown in FIGS. 7A-7D. A threaded capstan 700 may be thought of as including two main pieces or portions: a main pulley 710 having a threaded body 714 and a mounting end 718 and a termination clamp 720 through which a pin 722 may extrude (and which may be supported on a bearing in a mounting block or housing as shown in FIGS. 1 and 2). FIGS. 7A-7D illustrate how termination on the driving pulleys or capstans 700 may be achieved in a cable transmission. One cable segment 740 wraps around the pulley body 714 following the threads to the bottom or mounting end 718 of the capstan or pulley 700 where it terminates at pocket 716. A crimped stop sleeve applied to the cable segment 740 is held in this pocket 716 by a screw mounted in tapped hole 717. Cable segment 730 wraps upward around the capstan or pulley body 714 and terminates in slot 724 in the termination clamp 720. Again, a crimped stop sleeve terminates the cable 730 in this slot 724. The slot 724 is back recessed to stop the cable 730 and stop sleeve from coming out. The cable clamp 720 is clamped with a screw to the body 714 of the main pulley 710 and can be rotated to take up slack in the cable during installation (e.g., act as a tensioner for cable segment 730).

Figure 8:
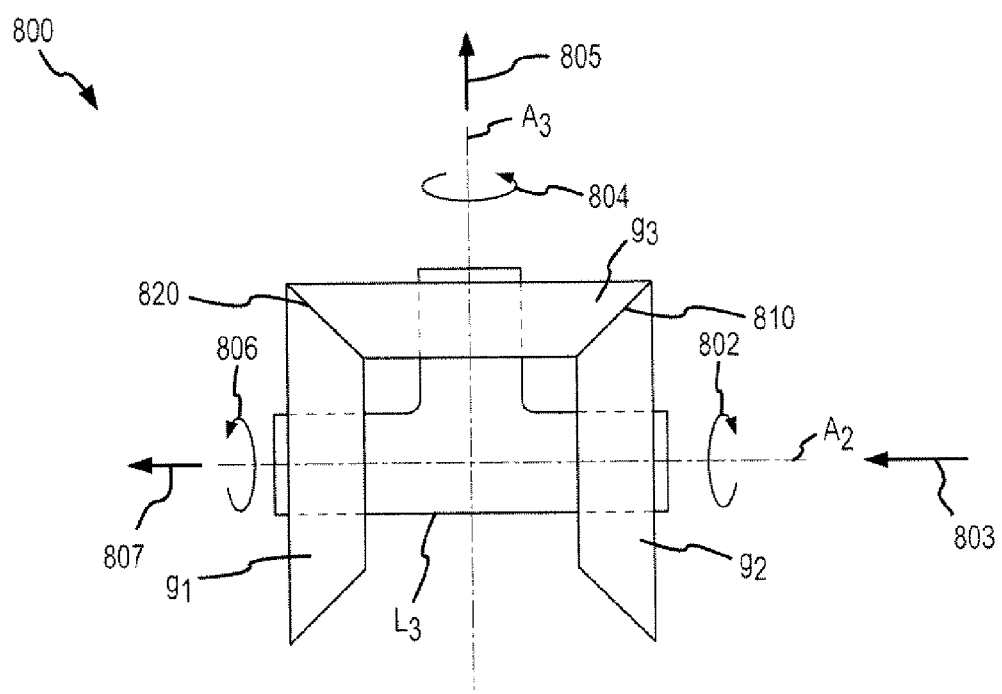
FIG. 8 illustrates schematically one embodiment of a cable driven differential of the present invention showing mating and arrangement of output differential gears.
Figure 9:
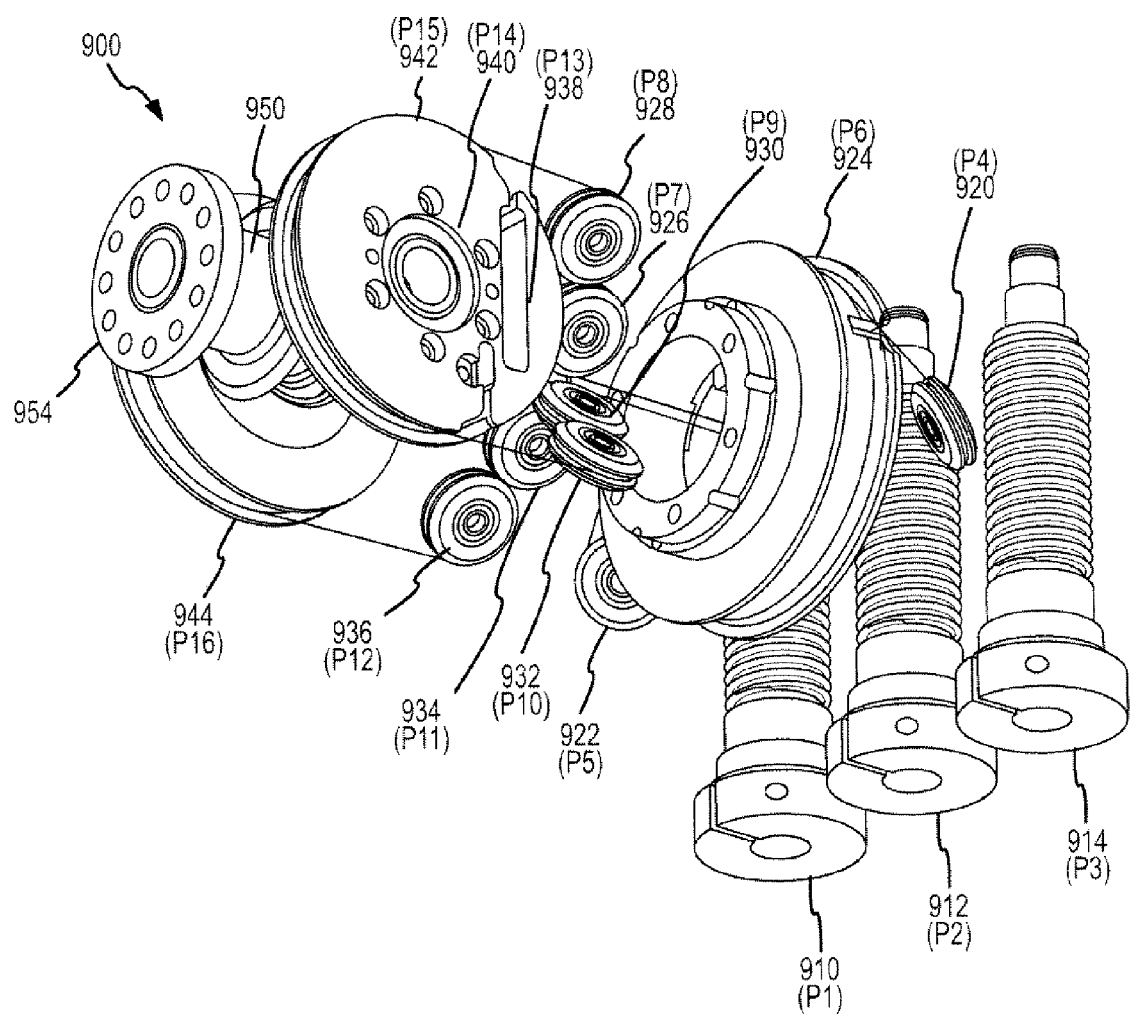
FIGS. 9-12 illustrate perspective, end, top, and side views a 3-axis robotic joint of the present invention similar to that shown in FIGS. 1 and 2 but further illustrating use of cable transmission to provide the three axes of movement or rotation of the robotic joint.
Figure 10:
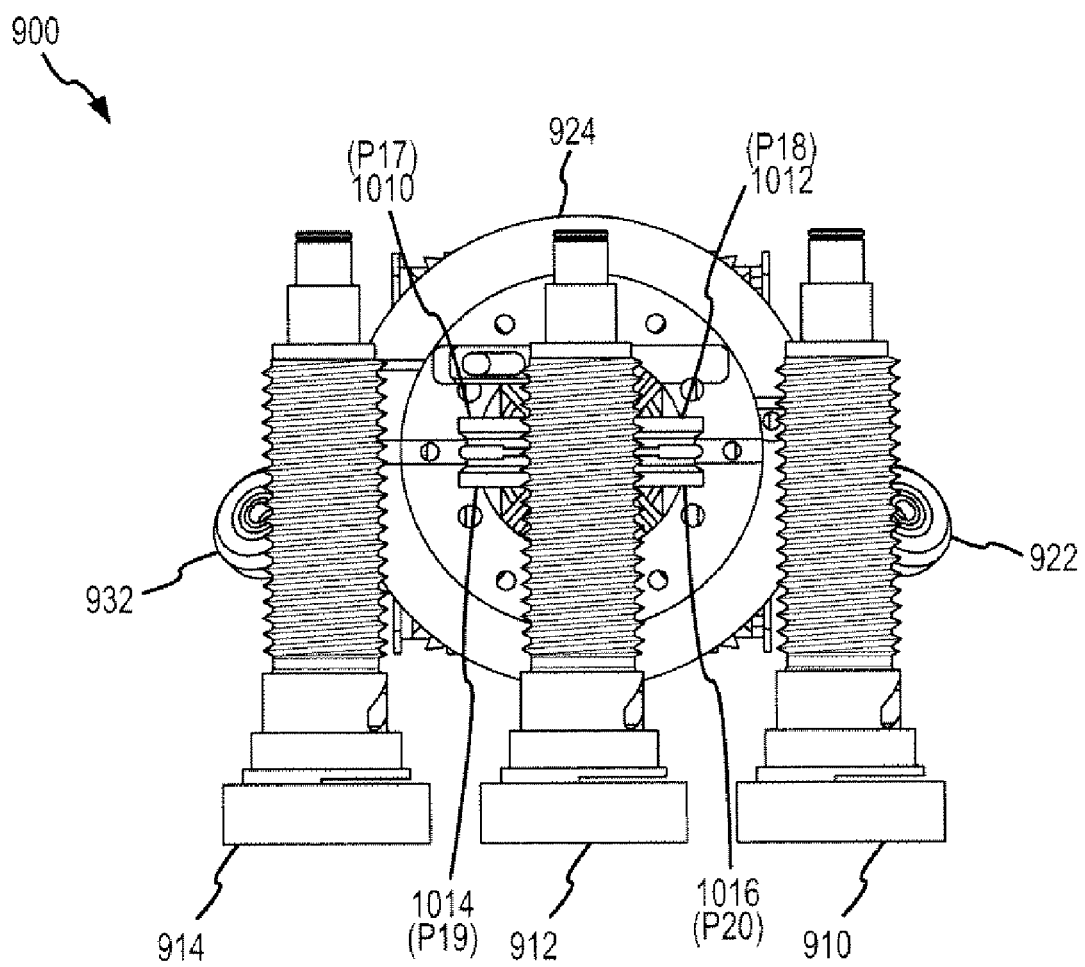
Figure 11:
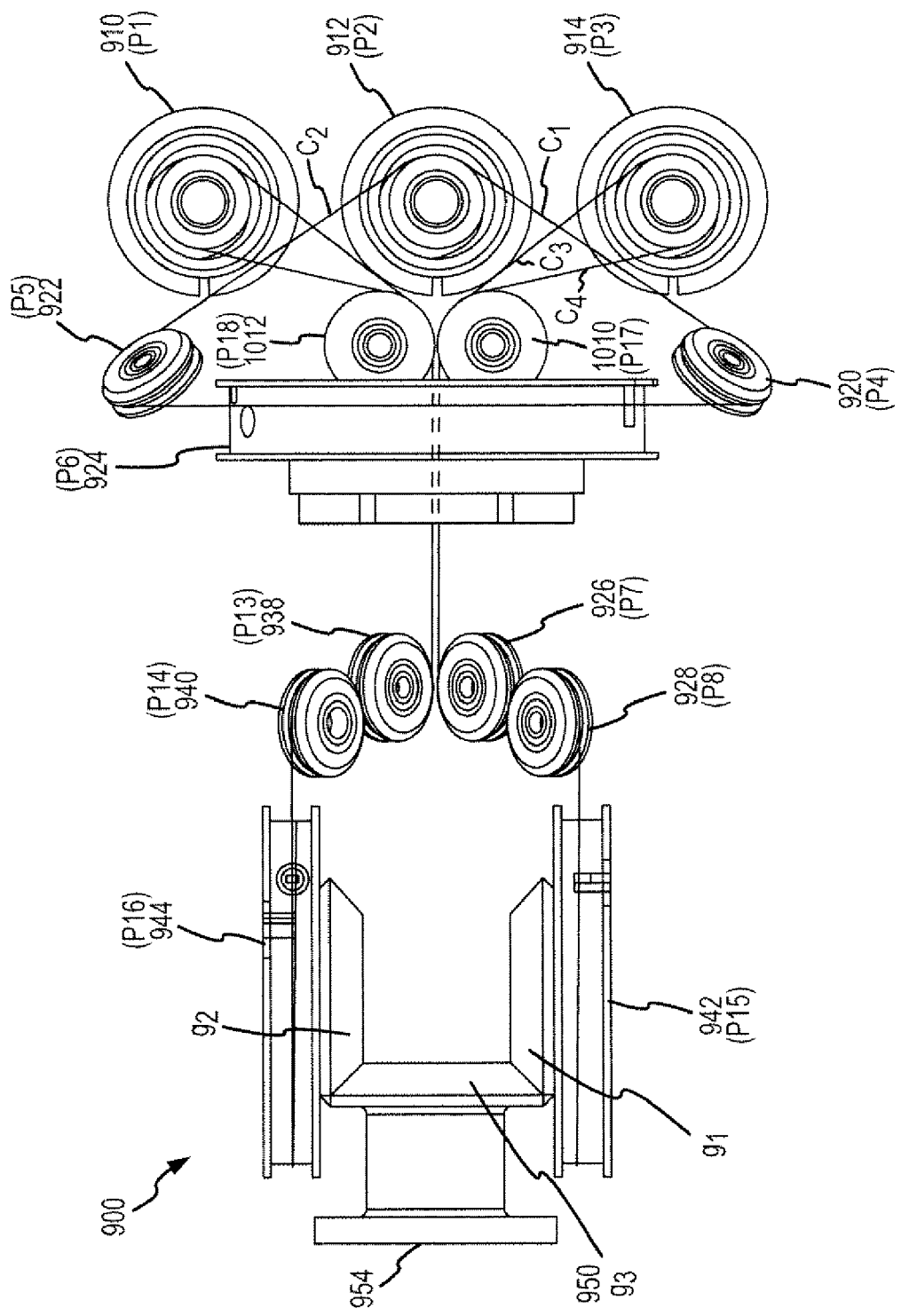
Figure 12:
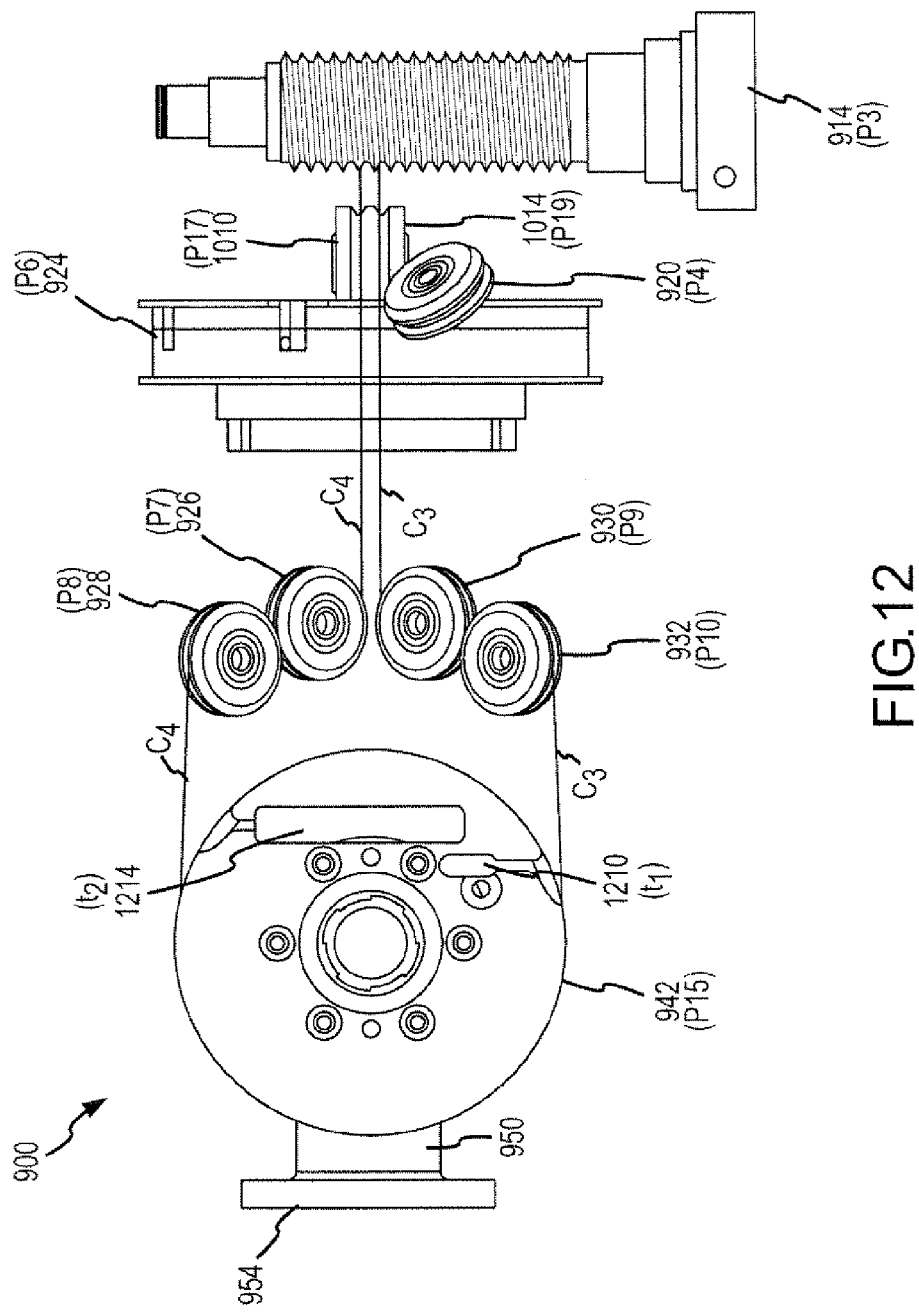

To better understand how 3-axis robotic joints of the present invention are actuated, it may be useful to understand the action of output differential gears. For example, in FIG. 1, the joint 100 is provided with a differential with first and second side gears 162 that are driven by shoulder drive pulleys 168 and top bevel gear 174 that is attached to threaded stub output 178. As shown in FIGS. 8-12, the gears may be labeled g1, g2, and g3, with gears g1 and g2 being cable driven (e.g., by cables or cable segments attached to shoulder drive pulleys 168 or pulleys P15 and P16 in FIG. 11). For ease of explanation, FIG. 8 illustrates schematically such a cable driven differential 800 while FIGS. 9-12 illustrate a physical implementation of a joint 900 including the differential 800. The link L3 (as shown also in FIG. 4) is supported by and connected rotatably to a fork which is fixed to pulley P6 or element 924. Pulleys P1 to P6 or elements 910, 912, 914, 920, 922, and 924 are all rotatably connected to a single structure or link L1 (such as to the block 120 shown in FIG. 1 that is mounted to a portion of the torso or within the body cavity of an animatronic figure as shown in FIG. 2 at 214).

Referring to FIG. 8, the differential 800 includes three mitre gears g1, g2, and g3 that are positioned or provided at the output of a shoulder joint in accordance with the invention. The gears g1, g2, and g3 are meshed to create a geared differential 800. The gears g1, g2, and g3 are mounted (as shown in FIG. 1 and FIGS. 9-12) rotatably to a "T" shaped link L3 (e.g., the combination of main shaft 160 and main block 170 in FIG. 1). The side gears g1 and g2 are mounted directly to driven pulleys 942, 944 (or P15 and P16) shown in FIGS. 9-12 and are, therefore, themselves cable driven. The output gear g3 meshes with both side gears g1 and g2. In the differential 800, gears g1, g2, and g3 may have the same number of teeth in some embodiments while other embodiments provide side gears g1 and g2 with the same number of teeth but with output gear g3 having a different number of teeth in order to alter the mechanical advantage applied to the output gear g3.

During operation, when gears g1 and g2 rotate in same direction as shown by 802 and 806 about axis A2 and at the same speed, there is no rotation of the output gear g3 about axis A3. The positive direction of rotation based on the right-hand rule for the gears g1, g2, and g3 are shown by arrows 803, 805, and 807, respectively. However, the entire link L3 is driven through output gear g3 to rotate about axis A2. When side gears g1 and g2 rotate in opposite directions at the same speed, there is no rotation of link L3 about axis A2. However, in this operational mode, the output gear g3 rotates 804 about axis A3 (with the direction of rotation 804 depending on the direction of rotations 802 and 806 of side gears g1 and g2). If all the gears g1, g2, and g3 have the same number of teeth, the output gear g3 rotates at the same speed as side gears g1 and g2. If side gears g1 and g2 operate at different speeds, the output speed of link L3 about axis A2 and output gear g3 about axis A3 are given by:

$$\begin{pmatrix} \omega_{A2} \\ \omega_{A3} \end{pmatrix} = \begin{bmatrix} \frac{1}{2} & \frac{1}{2} \\ \frac{-r_1}{2r_3} & \frac{r_1}{2r_3} \end{bmatrix} \begin{pmatrix} \omega_1 \\ \omega_2 \end{pmatrix}$$

where $\omega_{A2}$ is the angular velocity about axis A2, $\omega_{A3}$ is the angular velocity about axis A3, $\omega_1$ is the angular velocity of gear g1, $\omega_2$ is the angular velocity of gear g2, $r_1$ is the pitch radius of gears g1 and g2, and $r_3$ is the pitch radius of gear g3. It should be understood that other differentials may be used in place of differential 800 and that shown in FIG. 1 to effectively practice the invention. For example, cables and cable transmission devices may be used to provide a differential mechanism similar to that shown in U.S. Pat. No. 4,903,536, which is incorporated herein in its entirety by reference, or to create other useful cable driven differentials.

FIGS. 9-12 illustrate a 3-axis robotic joint 900 with installed cable (e.g., an installed cable transmission) and is useful for showing how the joint 900 drives each of its three axes using cables. With reference also to FIG. 4, the first axis A1 is driven by driving pulley P2 (i.e., capstan or pulley 912 that is actuated in typical embodiments by the output shaft of an electric motor). Pulley P2 is attached to cable segments c1 and c2, which run across idler pulleys P4 and P5 (i.e., pulleys 920, 922), respectively. Each cable segment c1 and c2 terminates on driven pulley P6 (i.e., pulley or roll drum 924). Pulley P6 forms the base of link L2, and, therefore, driving pulley P6 drives the first roll axis A1.

To actuate the remaining axes of the joint 900, the side gears g1 and g2 need to be driven. The following explains driving side gear g1 with driving side gear g2 being similar. The side gears g1 and g2 are driven by pulleys P3 and P1 (i.e., capstans or pulleys 914 and 910 that are, in turn, driven by outputs of electric motors (not shown in FIGS. 9-12)), respectively. To drive gear g1, cable segments c3 and c4 wrap around pulley P3 and terminate at each end of the pulley P3 as described with reference to FIGS. 7A-7D. Segment c4 runs over idler pulley P17 (i.e., pulley 1010) such that it is directed nearly along the axis of pulley P6 or along or parallel to input roll axis A1. The cable segment c4 then continues to run over pulleys P7 and P8 (i.e., pulleys 926, 928) such that it is directed along a tangent to driven pulley P15 (i.e., shoulder drive pulley 942). Segment c4 terminates on pulley P15 at point t1 (shown at 1210). Cable segment c3 runs over idler pulley P19 (i.e., pulley 1014) such that it is directed nearly along input roll axis A1. It then runs over pulleys P9 and P10 (i.e., pulleys 930, 932) such that it is directed along a tangent to driven pulley P15. It wraps around pulley P15 in the direction opposite to cable segment c4 and terminates at location t2 (shown at 1214). In the illustrated embodiment, termination t2 also incorporates a tensioning mechanism for the cable transmission. The cable typically is preloaded (e.g., a constant tension is preferably applied upon assembly) to a desired tension, $T_C$:

$$T_C > \tau_P / d_P$$

where $T_C$ is the tension of the cable, $\tau_P$ is the maximum torque applied to the pulley, and $d_P$ is the diameter at which the cable acts.

Side gear g2 is driven similarly. A key point to understand at this point is that since all four cable segments driven by pulleys P1 and P3 pass nearly along the input roll axis A1, rotation of pulley or roll drum P6 causes only a slight length change in any of these cable segments. The small elasticity of these cables accommodates this length change without causing appreciable additional forces or tensioning of the cable.

The result of this design of joint 900 (and joint 100 of FIG. 1) is that input actuators or electric motors and their associated driving pulleys P1, P2, and P3 may remain fixed to the base link L1 (e.g., be attached to a block or housing as shown in FIG. 1) This allows the motors to be packaged in the torso of the figure as shown at 214 in FIG. 2 (or within the form factor 210) where there is more room than trying to provide the motors and driving pulleys in the arm or shoulder. Also, the weight of the actuators and driving pulleys or capstans (e.g., their gravitational load) is not carried by the shoulder and their overall inertia does not contribute to the inertia being driven by the robotic joint 100, 900 during acceleration or operation.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A robotic joint, comprising:

a first link for attaching to a structural member of a robot body and comprising an electric actuator assembly mounted to a block;

a second link attached to the first link that is driven by the electric actuator assembly to rotate about a first axis;

a third link attached to the second link that is driven by the electric actuator assembly to rotate about a second axis orthogonal to the first axis;

a fourth link attached to the third link that is driven by the electric actuator assembly to rotate about a third axis orthogonal to the second axis;

a set of cables connected to the electric actuator assembly and to the second, third, and fourth links; and a roll drum mounted to the second link and attached to the cables to be driven by an electric motor to rotate about the first axis, wherein the first axis extends through the first link.

2. The robotic joint of claim 1, wherein the electric actuator assembly comprises three electric motors independently operable to drive the second, third, and fourth links and wherein the electric motors are spaced apart from the second, third, and fourth links, whereby the second, third, and fourth links are adapted for rotation apart from the electric motors.

3. The robotic joint of claim 2, wherein the electric actuator assembly further comprises three pulleys each connected to the output of one of the electric motors and to the cables to drive the second, third, and fourth links and wherein the three pulleys are positioned within the block.

4. The robotic joint of claim 1, further comprising a pair of shoulder drive pulleys mounted for rotation about the second axis and attached to the cables such that each of the shoulder drive pulleys is driven independently by one of the electric motors that differs from the electric motor driving the roll drum, wherein the cables driving the shoulder drive pulleys extend through the roll drum substantially parallel to the first axis.

5. The robotic joint of claim 4, wherein the shoulder drive pulleys are each rigidly attached to a gear mounted for rotation on the third link and wherein the fourth link comprises a gear driven member meshing with the gears attached to the shoulder drive pulleys to provide a rotation output about the third axis.

6. The robotic joint of claim 5, wherein the gears are each bevel gears and wherein the gears attached to the shoulder drive pulleys have an equal number of teeth.

7. A robotic joint for positioning in a human-joint form factor such as a shoulder joint, comprising:
a cable driven differential generating a rotation output about an output roll axis;
a roll drum rotatably mounted for rotation about an input roll axis;
a cable transmission comprising cables extending through a passageway in the roll drum to connections on the differential and cables connected to the roll drum; and
an electric actuator assembly with an output connected to the cables of the cable transmission and operating to independently drive the differential to create the rotation output and the roll drum to cause the roll drum to rotate about the input roll axis, wherein the roll drum is positioned between the electric actuator and the differential, wherein the input roll axis extends through the electric actuator assembly.

8. The robotic joint of claim 7, wherein the differential comprises a pair of side bevel gears meshed with an output member with a bevel gear portion meshing with the side bevel gears to rotate at the rotation output and wherein the side bevel gears are connected to pulleys that are connected to the cables of the cable transmission and rotatably mounted to be driven by the electric actuator assembly about a pitch axis that is orthogonal to the input roll axis.

9. The robotic joint of claim 8, wherein the electric actuator assembly comprises three electric motors with output pulleys positioned within a housing and attached to the cables of the cable transmission to independently drive the roll drum and the pulleys connected to the side bevel gears of the differentials wherein the input roll axis extends through the housing.

10. The robotic joint of claim 9, further comprising a T-shaped link member upon which the side bevel gears are mounted to rotate about a pitch axis and upon which the output member is mounted to rotate with the T-shaped link about the pitch axis and to rotate based on movement of the side bevel gears about the output roll axis, wherein the pitch axis is orthogonal to the input roll axis and to the output roll axis.

11. The robotic joint of claim 7, wherein the differential is attached to the roll drum to rotate about the input roll axis with the roll drum.

12. A robotic figure with a shoulder, comprising:
an actuator assembly comprising three electric motors with pulleys directly attached to outputs of the electric motors and a block housing the pulleys and supporting the electric motors;
a differential spaced apart from the actuator and generating an output rotation;
a set of cable segments connecting the actuator pulleys of first and second ones of the electric motors to the differential, wherein the differential is driven by operation of the first and second electric motors; and
a roll drum positioned between the actuator pulleys and the differential and mounted for rotation about an input roll axis that extends through the block,
wherein the roll drum is connected by one or more cable segments to the actuator pulley of a third one of the electric motors to be driven by the third electric motor and wherein the cable segments connecting the differential to the actuator pulleys of the first and second electric motors extends through an opening in the roll drum.

13. The robotic figure of claim 12, wherein the differential comprises three meshing gears with first and second ones of the gears mounted for rotating about a pitch axis orthogonal to the input roll axis and with a third one of the gears positioned between the first and second gears mounted for rotating at the output rotation about an output roll axis orthogonal to the pitch axis.

14. The robotic figure of claim 13, wherein the third gear is attached to cylindrical stub and wherein the third gear and the stub are driven by the actuator to rotate about the pitch axis while the third gear is driven by the first and second gears to rotate about the output roll axis.

15. The robotic figure of claim 13, wherein the first and second gears have equal numbers of teeth.

16. The robotic figure of claim 13, wherein the first and second gears are each attached to a pulley that is attached by the set of cable segments to one of the first and second electric motors to be driven to rotate about the pitch axis with the pulley by operation of the first and second electric motors and wherein the differential is linked to the roll drum to rotate about the input roll axis when the roll drum is driven by the third electric motor.

17. The robotic joint of claim 7, wherein the roll drum and the cable driven differential are spaced apart from the electric actuator assembly a distance of less than about 10 inches.

* * * * *